Aug. 25, 1936.     R. E. MILLER ET AL     2,052,190
ELECTROPNEUMATIC BRAKE
Filed Jan. 31, 1933     4 Sheets-Sheet 4

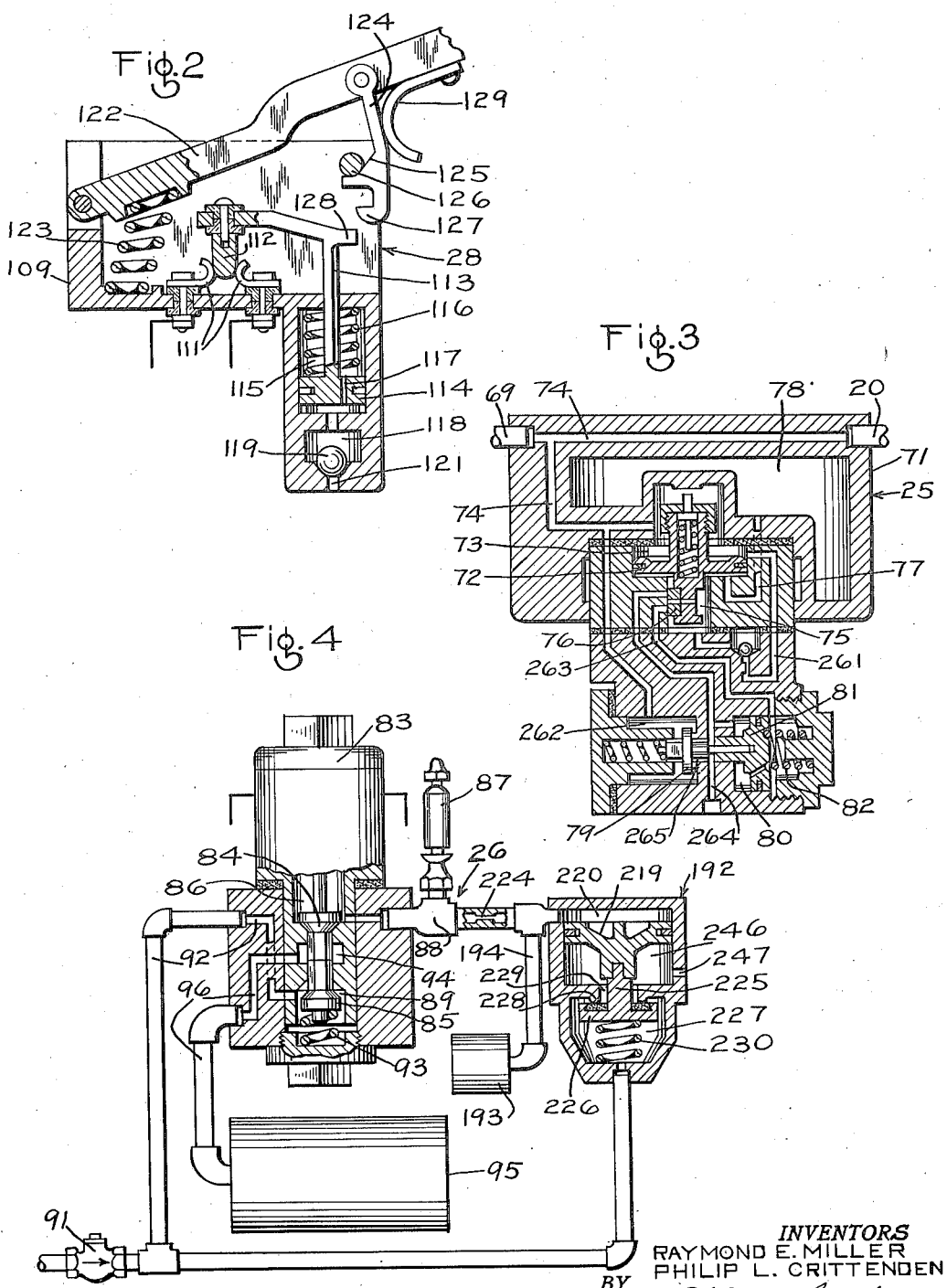

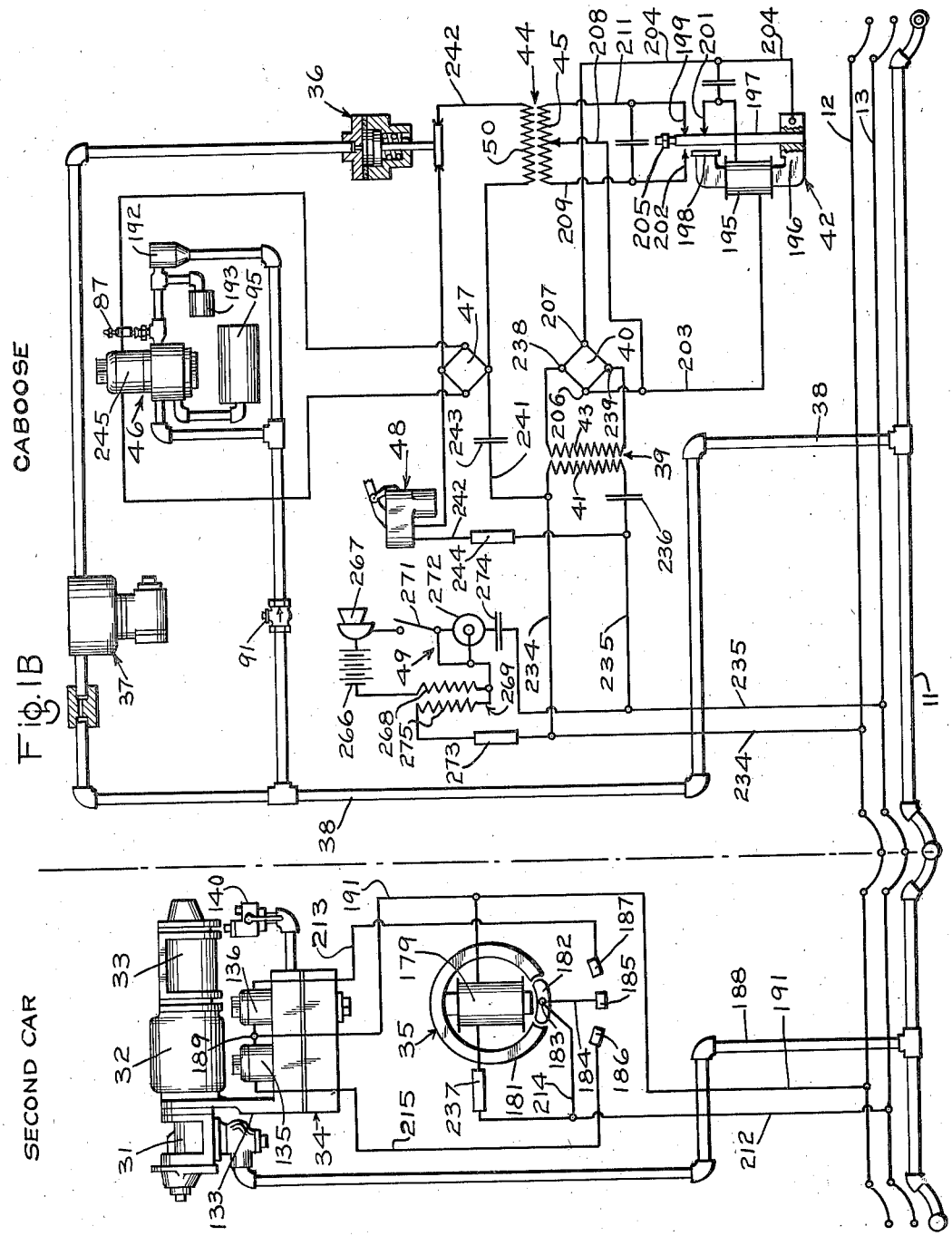

INVENTOR
RAYMOND E. MILLER
PHILIP L. CRITTENDEN
BY
ATTORNEY

Patented Aug. 25, 1936

2,052,190

UNITED STATES PATENT OFFICE 2,052,190

ELECTROPNEUMATIC BRAKE

Raymond E. Miller, Wilkinsburg, and Philip L. Crittenden, Edgewood, Pa., assignors to The Westinghouse Air Brake Company, Wilmerding, Pa., a corporation of Pennsylvania Application January 31, 1933, Serial No. 654,390

50 Claims. (Cl. 303—15)

This invention relates to fluid pressure brakes and more particularly to fluid pressure brake systems in which the application of the brake is controlled electrically and pneumatically.

In Patent No. 2,024,656 granted to Raymond E. Miller, one of the applicants herein, Electropneumatic brake, and assigned to the assignee of this application, an electro-pneumatic brake system is disclosed, wherein the brake equipment may be controlled pneumatically or electrically, and wherein a three-wire electrical circuit is employed for conducting direct current to the electrical brake control apparatus for normally electrically controlling the brakes of the train, and alternating current to various signal devices and to electrically controlled mechanism for effecting an application of the brakes in the event of failure of any of the three conductor wires or associated connections that would render the control circuit ineffective to control the electrically controlled brake equipment.

It is an object of this invention to provide an electro-pneumatically controlled brake equipment, wherein the normally electrically controlled brake equipment is controlled by a two wire electric circuit system energized by direct current for actuating the normally electrically controlled brake equipment and energized by alternating current of various frequencies, for actuating various signal, telephone and brake applying devices, the signal and brake applying devices being adapted to operate to actuate an audible or visual signal on the locomotive and caboose and to effect an application of the brakes respectively, in the event of such failure of the conductor or train wires, as would render the electrical control system ineffective for controlling the normally electrically controlled brake equipment.

Electro-pneumatic brake equipment is particularly advantageous for use on long trains, and under present operating conditions, trains may contain one hundred and fifty cars or more. In long trains it is necessary to simultaneously operate many electro-magnet valve devices connected in parallel across the train wires.

It is an object of this invention to provide a magnet valve device for an electro-pneumatic brake equipment having the above noted characteristics, wherein the energy required for its operation is reduced to a minimum and wherein the flow capacity of the valve device is materially increased, thereby enabling the operation of the magnet valve devices on a long train with a minimum of current consumption, while facilitating a rapid build up of brake cylinder pressure and a quick release of fluid under pressure from the brake cylinder to the atmosphere for insuring rapid release of the brakes.

A further object of the invention is to provide an electro-pneumatic brake equipment, wherein, upon a sudden reduction of brake pipe pressure, such as might be caused by a broken brake pipe or a burst hose, an application of the brakes is initiated at the front and rear end of the train, so that the usual shock incident to the running in of the slack will be minimized.

These and other objects of the invention that will be made apparent throughout the further description thereof, are attained by the electro-pneumatic brake equipment hereinafter described and illustrated in the accompanying drawings; wherein Figs. 1A and 1B taken together, constitute a diagrammatic view of an electro-pneumatic brake equipment embodying features of our invention;

Fig. 2 is a sectional view of a signal switch device employed in the equipment shown in Figs. 1A and 1B;

Fig. 3 is a sectional view of a release valve device employed in the equipment;

Fig. 4 is a signal valve device employed in the equipment;

Figure 1A:
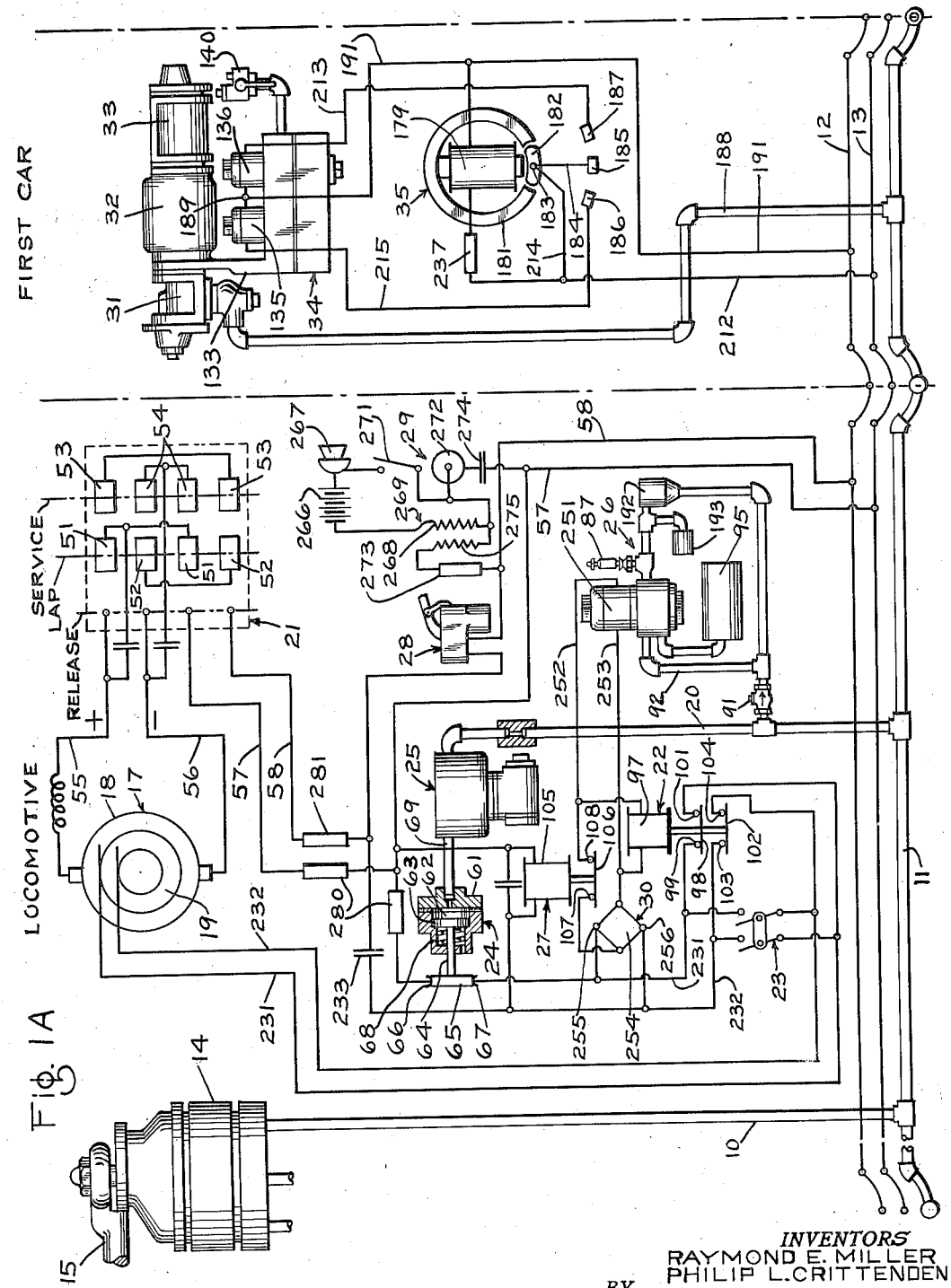

Referring to the drawings, the equipment includes apparatus mounted on the locomotive, cars and caboose of the train, and a brake pipe 11 and two train wires or conductors 12 and 13, respectively, which extend from the locomotive throughout the train to the caboose. It will be understood that the metal parts of the vehicles making up the train may constitute one of the conductors, preferably the conductor 12, to which the commonly connected terminals of the electro-magnet of the electro-magnet valve device is conductively connected.

The equipment carried upon the locomotive includes the usual main reservoir, not shown, brake valve device 14 having an operating handle 15 and connected in the usual manner to the main reservoir, feed valve device, not shown, and to the brake pipe 11 through the branch pipe 19. The locomotive equipment further includes a turbo-generator 17 having a direct current generator 18 and an alternating current generator 19; a brake switch device 21 for controlling the supply of direct current from the generator 18 to the train wires 12 and 13 for the purpose of controlling the electro-magnet valve devices on the cars and caboose of the train; a relay switch device 22 for controlling the supply of alternating current to the train wires 12 and 13 for energizing the signals, telephone and auxiliary brake controlling valve devices of the brake control equipment; a shunt switch device 23 for manually closing the circuit momentarily through the alternating current generator and the train conductors 12 and 13 when the relay switch device 22 is open; a pneumatic switch device 24 for controlling the supply of alternating current to the train wires 12 and 13; a brake pipe vent valve device 25 connected to the brake pipe 11 by branch pipe 20 and operative upon a reduction in brake pipe pressure at an emergency rate to effect opening operation of the pneumatic switch device 24; a combined electro-pneumatic signal device and brake application device 26 connected to the branch pipe 20 and controlled electrically for sounding an audible signal and effecting an application of the brakes when its electro-magnet is deenergized; a tuned frequency relay device 27 for controlling the supply of current to the magnet winding of the relay device 22; a signal switch device 28 for momentarily interrupting the alternating current circuit containing the electro-magnet of the signal device 26; a telephone device 29 by means of which the engineman may converse with the occupants of the caboose; a rectifier 30 and various filter devices and condensers to be hereinafter more specifically referred to, for blocking the flow of current alternating at definite and different frequencies.

The equipment carried on each car includes the usual triple valve device 31, by means of which the application and release of the brakes may be effected in the usual manner; an auxiliary reservoir 32; a brake cylinder 33; an electro-magnet valve device 34 and a polarized relay device 35 for controlling the supply of current to the electro-magnet windings of the electro-magnet valve devices.

The equipment carried on the caboose or last car of the train, includes, in addition to the brake equipment just listed as carried on the car, and not shown in the diagram, a pneumatic switch device 36 similar to the pneumatic switch device 24 of the locomotive; a brake pipe vent valve device 37 connected to the brake pipe 11 through branch pipe 38 for effecting opening operation of the pneumatic switch device 36 upon reduction of the brake pipe pressure at an emergency rate; a transformer 39, having its primary winding 41 connected across the train wires 12 and 13 for energizing an alternator device 42 through the transformer secondary winding 43 and a rectifier 40; a transformer 44 having its primary winding 45 connected across the alternator device circuit, and its secondary winding 50 connected across the train wires 12 and 13 for supplying alternating current to the said train wires at a higher frequency than that of the alternating current generator 19; a combined electro-pneumatic signal and brake application device 46, connected to the train wires 12 and 13 through a rectifier 47; a signal switch device 48; a telephone device 49 and various filter devices and condensers to be hereinafter more fully described.

The brake controlling switch 21 is diagrammatically shown in Fig. 1A. The development of the switch drum indicated in the figure, shows that the switch comprises eight contact members divided into two groups of four contact members 51, 52, 53, and 54 each, the corresponding contact members of each group being conductively connected.

The contact members are so grouped and connected that when the switch drum is in lap position, the positive conductor 55 and the negative conductor 56 are connected, respectively, to conductors 57 and 58, which are connected to the train conductors 13 and 12, respectively. When the contacts are in the service position, the positive conductor 55 and the negative conductor 56 are, respectively, connected to conductors 58 and 57, thereby reversing the polarity of the current in the branch conductors 57 and 58 and the train wires 13 and 12.

When the brake switch drum is in release position, the branch conductors are disconnected from the positive and negative conductors 55 and 56. The brake switch 21, therefore, serves to interrupt the direct current circuit through the train wires 12 and 13 when in release position and to reverse the polarity of the current in the train wires when moved from lap to application position or vice versa.

The pneumatic switch device 24 on the locomotive comprises a casing 61 having a chamber 62 containing a piston 63 having a stem 64 which carries a bridging switch 65 for engaging switch contacts 66 and 67. The piston 63 and bridging switch 65 are yieldingly biased toward open position by a spring 68 and the switch is adapted to be releasably retained in the closed position, shown in Fig. 1A, by fluid under pressure supplied to the chamber from the brake pipe 11 through the branch pipe 20, the brake pipe vent valve device 25 and a pipe 69.

The brake pipe vent valve device 25 is shown in section in Fig. 3 and comprises a casing 71 containing a piston 72 having at one side a chamber 73 connected through passage 74 to branch pipe 20, and having at the opposite side a valve chamber 75 containing a slide valve 76 adapted to be operated by said piston, the valve chamber 75 being connected through a passage 77 to a volume chamber 78 formed in the casing. The brake pipe vent valve device further comprises a vent valve 79, a piston chamber 80 containing a piston 81 for seating said vent valve and a spring 82 for unseating said vent valve.

The combined electro-pneumatic signal and brake application device 26 is shown in Fig. 4 and comprises a magnet 83 adapted to operate oppositely seating valves 84 and 85, the valve 84 being contained in a chamber 86 which is open to the whistle 87 through a passage and pipe 88, and the valve 85 being contained in a chamber 89 to which the branch pipe 20 is connected through a check valve device 91 and a pipe and passage 92. Also contained in the chamber 89 is a spring 93, the pressure of which tends to seat the valve 85 and unseat the valve 84.

Intermediate the valves 84 and 85 there is a chamber 94 which is connected to a fluid pressure supply reservoir 95 through a passage and pipe 96. A brake pipe vent valve device 192 is associated with the signal device and comprises a timing reservoir 193 connected to the pipe 88 through a branch pipe 194, and a piston 219 having on the upper face a chamber 220 open to the chamber 86 of the magnet valve device, through the pipe 88 and the restricted passage 224 therein. The piston is provided with a stem 225 which carries a valve 226 contained within a valve chamber 227 that is open to the brake pipe 11.

The relay switch 22 comprises a magnet winding 97 for operating a two pole switch having a bridging member 98 for engaging contacts 99 and 101 and a bridging member 102 for engaging contacts 103 and 104. The bridging members are retained in the closed position, shown in Fig. 1A, when the winding 97 is energized and are moved to open position when the winding is deenergized. The relay device is also provided with means, not shown, for effecting a delayed action of the bridging members to open position when the winding thereof is deenergized, the time of delay being preferably two seconds. A switch of this general character is disclosed in the patent of Clyde C. Farmer, No. 2,017,791, Electro-pneumatic brake, assigned to the assignee of this application.

The signal switch device 28 is shown in Fig. 2 and is similar to that disclosed in the last said copending application, and comprises a casing 109 having a pair of switch contacts 111 which are engaged by a bridging contact 112 carried upon a stem 113 that is connected to a piston 114 within a dash pot chamber 115. The piston 114 and bridging contact 112 are biased toward closed position by a spring 116, and movement of the piston toward its closed or innermost position is controlled by the orifice 117 in the piston, which so limits the escape of fluid from the chamber 118 beneath the piston that at least two seconds are required for the bridging contact 112 and piston to move from open position to closed or contact engaging position. A small check valve 119 normally closes the atmospheric passage 121, but permits air to flow freely through the passage 121 into the chamber beneath the piston when the latter is moved upwardly.

The bridging contact 112 is moved to open position by a manually operable arm 122 pivoted on the casing and which is normally biased toward its outer position by a spring 123. The arm 122 carries a pivoted dog 124 having an inclined cam surface 125 for engaging a fixed pin 126 upon upward movement of the arm 122, and the lower extremity of the dog 124 is provided with a latching finger 127 that engages the under face of a lug 128 on the stem 113 after the arm 122 is moved to its innermost position.

A leaf spring 129 presses the dog toward the lug 128, so that when the arm 122 is in its lowermost position the finger may engage the lug. When the upper arm 122 is released by the operator, the spring 123 forces the arm 122 outwardly carrying with it the stem 113 and thus disengages the bridging contact 112 from the contact 111. When the pin 126 is engaged by the inclined cam, upon outward movement of the arm 122, the dog 124 is forced outwardly by the cam 125, thereby releasing the lug 128, permitting the piston to slowly descend toward its inner position, the movement being retarded by the fluid in the chamber beneath the piston, which can only escape through the restricted passage 117 in the piston 115.

The telephone device 29 is of the usual type to be hereinafter referred to.

Figure 5:
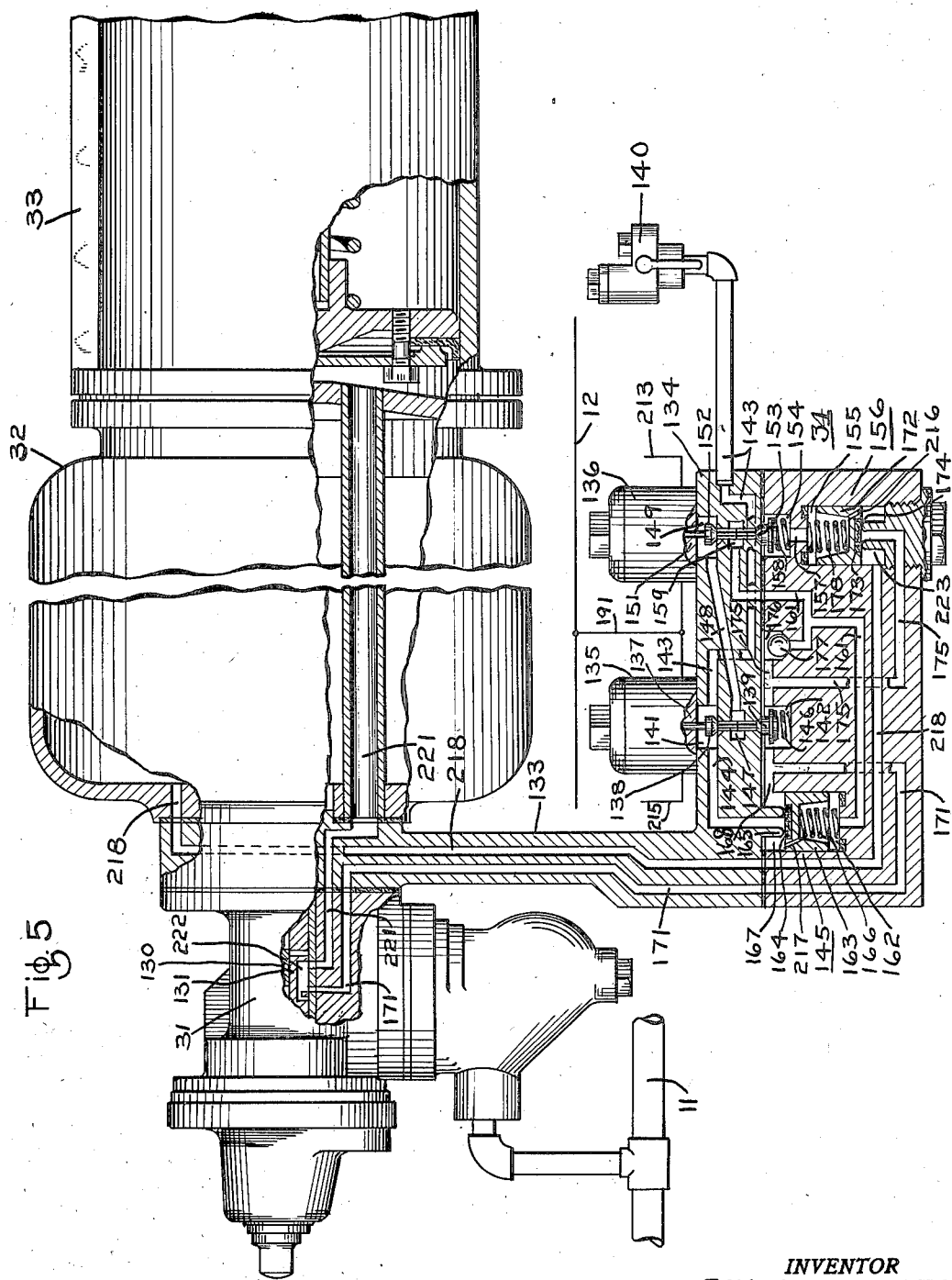
Fig. 5 is an elevational view, partly in section, of a brake controlling unit including the improved electro-magnet brake controlling valve devices.

Referring to Figure 5, the triple valve device 31 for each car and the caboose is of the usual well known type comprising a piston, not shown, that is adapted to operate a main slide valve 131 and a graduating valve 130 in response to a reduction in brake pipe pressure, for effecting an application of the brakes.

The magnet valve device 34 associated with each triple valve device, comprises a cover portion 134 that is integral with the pipe bracket 133 of the triple valve device 31. The cover portion is provided with a lap magnet valve device 135 and an application magnet valve device 136. The lap magnet valve device may comprise a magnet 137 adapted to control oppositely seating valves 138 and 139 contained in chambers 141 and 142, respectively, the chamber 141 being connected to a retaining valve device 140 through pipe and passage 143, and to a relay valve device 145 through a passage 144. Contained within the chamber 142 is a spring 146, the pressure of which tends to seat valve 139 and unseat valve 138. Intermediate the valves 138 and 139 there is a chamber 147 having a passage 148 which leads to a chamber 149 of the application magnet valve device 136.

The application magnet valve device 136 may comprise a magnet 151 adapted to control oppositely seating valves 152 and 153 contained in chambers 149 and 154, respectively, the chamber 154 communicating with the chamber 155 of a relay valve device 156 through passage 157. The chamber 154 contains a spring 158, the pressure of which tends to close the valve 153 and open valve 152. Intermediate the valves 152 and 153 there is a chamber 159 having a passage 161 leading to a chamber 162 of the relay valve device 145.

The relay valve device 145 may comprise a piston 163 contained within the chamber 162, and having a sealing seat 164 on one face adapted to engage an annular valve seat 165 and close the passage 144. A spring 166 contained within the chamber 162 tends to normally retain the piston in seated position. Communication from the chamber 167, at the upper face of the piston 163, to the chamber 142 of the lap magnet valve device 135, is established through passages 168 and 171.

The relay valve device 156 may comprise a valve piston 172 contained within the chamber 155, and having a sealing seat 173 adapted to engage an annular valve seat 174 for closing a passage 175 leading to the chamber 142 of the lap magnet valve device and to a chamber 176 containing a ball check valve 177, which is adapted to prevent a back flow of fluid under pressure from the chamber 176 to the passage 161. A spring 178 contained within the chamber 155 tends to seat the valve piston 172.

Referring to Figure 1A or 1B, the polarized relay device 35 may comprise a magnet winding 179 cooperating with a core member 181 and an oscillating armature 182 that is pivotally mounted upon a pin 183, so that when direct current flows through the winding in one direction the armature will rotate clockwise and when the direct current flows through the winding in the opposite direction, the armature rotates in the opposite direction. The armature carries a switch arm 184 having a switch contact 185 adapted to alternately engage contacts 186 and 187 depending upon the polarity of the current flowing through the winding 179 as controlled by the brake switch 21, which is essentially a polarity reversing switch. When the winding is deenergized, the switch arm 184 occupies the intermediate open position shown in Figs. 1A and 1B.

As indicated in Figs. 1A and 1B, the brake pipe 11 is connected to the triple valve devices 31, in the usual manner, by branch pipes 188 and the contacts 186 and 187 of the polarized relay switch devices 35 are connected, respectively, to the magnets 137 and 151 of the corresponding magnet valve devices 135 and 136, respectively, the conductor 189, which connects the remaining terminals of the electro-magnets 137 and 151, being connected to the train wire 12 by a conductor 191.

The pneumatic switch device 36, the signal switch device 48, the combined electro-pneumatic signal valve device and brake applying device 46, and vent valve device 37 on the caboose are similar in construction and operation to those corresponding devices on the locomotive.

The alternator 42 on the caboose may comprise a magnet winding 195 surrounding a pole piece 196 of U-shape having a flexible armature 197 normally biased away from a contact leg 198 of the pole piece, in which position the conductive armature engages contacts 199 and 201, thereby establishing a circuit through the winding 195, which, when energized, attracts the armature into engagement with the contact leg 198 of the pole piece 196 and contact 202. The alternator is energized by the secondary coil 43 of the transformer 39 which supplies alternating current through the rectifier 40, which in turn supplies direct current to the winding 195 through conductor 203 and to the pole piece 196 through conductor 204.

The vibrating armature is provided with an adjustable weight 205 for varying the period of oscillation of the armature and the weight is preferably adjusted to cause the armature to vibrate at a frequency of two hundred oscillations per second.

When the winding 195 is energized by current flowing from the terminal 206 of the rectifier 40, through conductor 203, winding 195, contact 201, armature 197, pole piece 196, conductor 204 and the terminal 207 of the rectifier 40, the armature 197 is flexed to the left into engagement with the contacts 198 and 202. A circuit through the left end of the primary winding 45 of the transformer 44 is then momentarily established from contact 206 of the rectifier 40 through conductor 203, conductor 208, left end of winding 45, conductor 209, contact 202, armature 197, conductor 204 to the terminal 207 of the rectifier. Thus an electrical impulse is induced in the secondary winding 59 of the transformer 44.

The instant that the armature separates from contacts 199 and 201, the circuit through the winding 195 is interrupted and after the armature 197 has made contact with the contact 202, the tension of the flexible armature returns the armature into engagement with contacts 199 and 201, which reestablishes the circuit through the winding 195, and the operation is thus continually repeated.

When the armature 197 engages the contacts 199 and 201, a circuit through the right end of the primary winding 45 is momentarily established from the terminal 206 of the rectifier 40 through conductors 203 and 208, the right end of transformer winding 45, conductor 211, contact 199, armature 197 and conductor 204 to terminal 207 of the rectifier, and current is momentarily induced in the winding 59 of the transformer 44. Thus in the foregoing manner, two hundred cycle alternating current is induced in the secondary winding 59 of the transformer 44.

Direct current generated by the generator 18 energizes the magnets 135 and 136 of the magnet valve devices 34, through a circuit including the conductors 55 and 56 and the brake controlling switch device 21, conductors 57 and 58, train wires 13 and 12, respectively, conductors 191 and 212 connected to train wires 12 and 13, the polarized relay switch device 35 and conductor 215.

When the brake controlling switch device 21 is in release position, the lap and application magnet valve devices 135 and 136, respectively, are deenergized.

In order to minimize the current ordinarily consumed by the large number of magnet valve devices on a long train, the oppositely seating valves of the magnet valve devices 135 and 136 are made unusually small and their sole function is to control the operation of the relatively light relay valve pistons 163 and 172, which are operated pneumatically and control the flow of fluid in the system for effecting the desired operation of the brake equipment.

In the release position of the brake controlling switch 21, the magnet valve devices 135 and 136 are deenergized so that the valves 139 and 153 are seated by their respective springs 146 and 158, while the valves 138 and 152 are unseated, and the relay valves 163 and 172 are held in their seated positions by their respective springs 166 and 178, as shown in Fig. 5.

With the parts of the car electro-pneumatic brake equipment in release position, as shown in Fig. 5, the system is charged with fluid under pressure in the usual manner of pneumatically controlled brake apparatus, and fluid under pressure flows from the brake pipe 11 through the triple valve device 31 in the usual manner to the auxiliary reservoir 32. The brake cylinder 33 communicates with the atmosphere through passage 221, cavity 222 of the side valve 131, passages 171 and 169, chamber 167, restricted passage 217 in the valve piston 163, chamber 162, passage 161, chamber 159, past the open valve 152, chamber 149, passage 148, chamber 147, past open valve 138, chamber 141, passage and pipe 143 and the pressure retaining valve device 140.

With the parts of the electro-pneumatic brake equipment in release position, fluid also flows from the auxiliary reservoir 32 through passage 218 to the chamber 223 in the application relay valve device 156 and thence through the restricted passage 216 in the valve piston 172 to chamber 155 above said valve piston. Chamber 167 at the upper side of the lap relay piston 163 being open to the atmosphere through the pressure retaining valve device 140 in the manner described above, chamber 142 which is connected to chamber 167 through passage 168 is also open to atmosphere through the pressure retaining valve device 140. Chamber 141 of the lap magnet valve device 135 communicates with the atmosphere through passage and pipe 143 and the pressure retaining valve device 140 in the manner described above. Chamber 162 beneath the lap magnet relay valve piston 163 also communicates with the atmosphere through the retaining valve device 140, in the manner above described.

In order to effect a service application of the brakes electrically, the brake controlling switch device 21 is turned to service position, in which the positive conductor 55 is connected to the conductor 58 and current flows in one direction through the train wire 12, conductor 191, polarized relay winding 179 and conductor 212 to the then negative train wire 13, causing the armature contact 185 to be moved into engagement with the contact 187, thereby establishing a circuit across conductors 12 and 13 through conductor 191, magnet winding 151 of the application magnet valve device 136, conductor 213, contacts 187 and 185, switch arm 184, conductor 214 and conductor 212, thus energizing winding 151 and thereby causing the valve 152 of the application magnet valve device 136 to close and valve 153 to open. The lap magnet winding 137 remains deenergized when the brake controlling switch is in service position.

With the valve 152 closed and the valve 153 open, communication between the brake cylinder and the atmosphere, through the restricted passage 217, past the valve 152, in the manner described, is closed and fluid under pressure within the chamber 155 is vented to the brake cylinder through passage 157, valve chamber 154, past the open valve 153, chamber 159, passage 161, past the ball check valve 177, chamber 176, passage 175, chamber 142, passages 168 and 171, cavity 222 of the slide valve 131 and passage 221. The greater pressure of the fluid at auxiliary reservoir pressure acting on the outer seated area of the valve piston 172, then forces it upward against the pressure of the spring 178 and fluid under pressure may then flow from the auxiliary reservoir 32 to the brake cylinder 33 through passage 218, chamber 223, past the open valve piston 172, passage 175, chamber 142, passages 168 and 171, cavity 222 of the slide valve 131 and passage 221.

When the desired pressure is obtained in the brake cylinder, the brake controlling switch 21 is moved to lap position, in which position the positive conductor 55 is connected to the conductor 57 and the direction of current flow is reversed and current flows through the train wire 13, conductor 212 and winding 179 of the polarized relay device, conductor 191 to the then negative train wire 12, causing the armature contact 185 to be moved out of engagement with contact 187, thereby deenergizing the magnet valve device 136, and into engagement with the contact 186, thereby establishing a circuit across conductors 12 and 13 through conductors 212 and 214, switch arm 184, contacts 185 and 186, conductor 215, magnet winding 137 of the lap magnet valve device 135 and conductor 191, thus energizing the winding 137 and thereby causing the valve 138 of the lap magnet valve device 135 to close and the valve 139 to open.

In lap position of the brake switch, the winding of the application magnet valve device 136 is deenergized, so that the oppositely seating valves 152 and 153 are returned to their original positions as shown in Fig. 5, and the lap magnet winding 137 is energized as above described.

With the lap magnet winding energized and the application magnet winding deenergized, the valve 138 is in closed position and valve 139 is in open position and valve 152 is in open position and valve 153 is in closed position. Closing of valve 153 permits fluid to equalize from chamber 223 through the restricted port 216 into chamber 155, thereby permitting the spring 178 to force the valve piston 172 to its seat, thereby shutting off the further flow of fluid under pressure from the auxiliary reservoir to the brake cylinder past said valve piston.

With the valve 138 closed, communication between the brake cylinder 33 and the atmosphere, by way of the restricted port 217 and also past the then open valve 139 and through the pressure retaining valve device 140, is closed, and fluid under pressure is retained within the brake cylinder, thus retaining the brakes applied.

The brake controlling switch contacts are so arranged that when the switch is moved from service to lap position or vice versa, the polarity of the current in conductors 12 and 13 is reversed without appreciable interruption of the current and the polarized relay valve device 35 is so designed that it causes an energization of one magnet winding substantially the instant the other is deenergized, with the result that the valve 138 is closed at substantially the same instant that the valve 152 is opened, when the brake switch is moved from service to lap position, thus preventing the flow of fluid under pressure from the brake cylinder through restricted port 217 and past the then open valve 152.

The valve 139 is open at substantially the same instant that the valve 152 is open, thus permitting fluid under pressure to flow into the chamber 147, passage 148 and chamber 149, from the passage 168, in order to rapidly equalize pressures within the chamber 159 and passage 161 and thereby prevent such reduction of fluid pressure in the chamber 162 as would cause unseating of the valve piston 163 when the magnet valve device 136 is deenergized and the magnet valve device 135 is energized, as when shifting the brake switch from service position to lap position.

When the brake controlling switch is moved to release position for releasing the brakes, the magnet valve device 135 is deenergized and its respective oppositely seating valves are promptly returned to their original position, as shown in Fig. 5. Since the service magnet valve device 136 is already deenergized, both oppositely seating valve devices are, therefore, in their respective positions shown in Fig. 5, when the parts of the equipment are in the release position, whereupon, communication is established from the chamber 162 to the atmosphere through passage 161, chamber 159, past the open valve 152, chamber 149, passage 148, chamber 147, past open valve 138, passage and pipe 143 and the pressure retaining valve device 140.

The higher brake cylinder pressure within chamber 167 acting on the upper face of the valve piston 163, forces the valve piston to open position and permits fluid under pressure to flow from the brake cylinder to the atmosphere through passage 221, cavity 222 in the slide valve 131, passages 171 and 168, chamber 167, past the open valve piston 163, passage 144, chamber 141, passage and pipe 143 and retaining valve device 140, thus permitting the fluid to exhaust to the atmosphere through passages of larger flow capacity than those of the relatively small oppositely seating valves, which serve to control the operation of the valve piston 163.

The restricted passage 217 in the valve piston 163, serves to permit flow of fluid from the brake cylinder to the chamber 162 and to atmosphere when the brake cylinder pressure has been reduced to the pressure at which the spring 166 forces the valve piston 163 to closed position.

The ball check valve 177 is provided between passage 175 and passage 161 in order to prevent a back flow of fluid from the brake cylinder to passage 161 during the release operation, which condition might interfere with rapid opening movement of the valve piston 163 and delay release of the brake.

From the foregoing, it is apparent that the brake equipment may be controlled electrically by the brake switch device 21. In the event of failure of the electrical equipment, which would interrupt the circuit while the brakes are under the control of equipment in the circuit through the train wires 12 and 13, the magnet valve devices 135 and 136 become deenergized and automatically assume positions as shown in Fig. 5, wherein proper channels are established for permitting pneumatic control of the brake equipment in the usual manner.

Since the magnet valve devices 135 and 136 on all the cars throughout the train are operated on a normally open direct current circuit, a normally closed checking circuit is so associated with the direct current circuit that a signal, energized on the locomotive and caboose of the train, is sounded in the event of failure of the control circuit, for apprising the trainman of any failure thereof that would interfere with proper operation of the electrical brake equipment. Furthermore, means are provided, as will now be described, that function upon such failure of the control circuit, to occasion a reduction of the brake pipe pressure for initiating an application of the brakes. The checking circuit is also equipped with a telephone system whereby a trainman may converse with others located at a remote station on the train.

*Construction and operation of the checking, signal and telephone circuit*

The checking circuit includes the train conductors 12 and 13, which are normally energized by the alternating current generator 19 carried on the locomotive and which is connected to the conductors 57 and 58 by conductors 231 and 232, respectively, through the medium of a double pole relay switch device 22 which is of the time delay type, such as disclosed in the above mentioned copending application. The relay switch device 22 is provided with bridging switch members 98 and 102 for respectively connecting contacts 99—101 and 103—104. The relay switch device 22 is adapted to be closed and held in closed position when the holding winding 97 thereof is energized in a manner to be hereinafter described. The conductor 231 is also provided with a single pole pneumatically operated switch device 24 and a condenser 233 is disposed in the conductor 232 for preventing the flow of direct current from the conductor 58 through the conductors 232 and 231 to the alternating current generator 19.

The checking circuit is completed by the primary coil 41 of the transformer 39 carried on the caboose, and which is connected by conductors 234 and 235, respectively, to the train wires 12 and 13. The conductor 235 is provided with a condenser 236 for preventing direct current from flowing through the winding 41 of the transformer 39 and thus short circuiting the direct current circuit through the polarized relay winding 179.

The polarized relay 35 is protected from being detrimentally affected by the alternating current in the checking circuit, including train wires 12 and 13, by a filter device 237 designed to prevent passage of alternating current impulses to the winding 179.

The secondary winding 43 of the transformer 39 carried on the caboose, is inductively energized by the primary winding 41 when the relay switch 22 on the locomotive is closed, as shown in Fig. 1A, and is connected across terminals 238 and 239 of the rectifier 40, which serves to energize the alternator device 42 and supply it with rectified direct or continuous current. The alternator operates in the manner previously described to generate an alternating current in the primary winding 45 of the transformer 44 having a different frequency of alternation than that of the alternating current generator, for example, a frequency of two hundred cycles per second. A secondary winding 50 of the transformer 44 is inductively energized by the primary winding 45 and is connected across the branch conductors 234 and 235 by conductors 241 and 242, respectively, so that a two hundred cycle alternating current is superimposed on the sixty cycle alternating current supplied to the checking circuit by the generator 19.

A condenser 243 disposed in the conductor 241, prevents the flow of direct current across the conductors 12 and 13 through the secondary winding 50 of the transformer 44 and the associated circuits, and a filter device 244 is connected in the conductor 242 for preventing the passage of sixty cycle alternating current from the circuit through the branch conductors 234 and 235, to the circuits through the secondary winding 50 and associated circuits.

The rectifier 47 is connected across the conductors 241 and 242 and supplies rectified continuous or direct current to the magnet valve device 245 of the combined signal and brake applying device 46 on the caboose.

From the foregoing, it is apparent that the train wires 12 and 13 are energized by direct current when the brake switch 21 is in either service or lap position, for effecting operation of the magnet valve devices which control the brakes on the train, and that normally, during operation of the train, a sixty cycle alternating current is imposed on the train wires 12 and 13 by the generator 19, and a 200 cycle alternating current is imposed on the train wires 12 and 13 by the alternator device 42 through the medium of the transformer 44.

The tuned frequency relay switch device 27 on the locomotive, is connected across the conductors 231 and 232 and is adapted to respond only to an alternating current having a frequency of substantially two hundred cycles and when energized by the two hundred cycle alternating current generated by the alternator device 42 on the caboose, moves the relay switch member 106 to closed position in engagement with the contacts 107 and 108, thereby closing a circuit through the magnet valve device 251 of the combined signal and brake application device 26 and the winding 97 of the relay switch device 22, both of which devices are mounted on the locomotive. The circuit including said devices and conductors 252 and 253 is supplied with rectified continuous current by a rectifier 254 that is connected across conductors 231 and 232, the conductors 231 and 232 being connected to terminals 255 and 256, respectively, on the rectifier. When the winding 97 of the relay switch 22 is energized, the bridging switch members 98 and 102 thereof are held in closed position in engagement with their respective contacts and are retained in closed position, so long as the winding 97 is energized.

When it is desired to place the electrical control circuit in operating condition, as when the train is in operation, assuming the relay switch 22 to be open, the alternating current generator 19 and the direct current generator 18 are operated for generating the necessary sixty cycle alternating current and direct current. The manual starting switch 23 is momentarily closed, thus causing sixty cycle alternating current to be supplied to the train wires 12 and 13 through conductors 231 and 232 and the branch conductors 57 and 58, respectively.

Energization of the train wires 12 and 13 with sixty cycle alternating current, energizes the primary winding 41 of the transformer 39 on the caboose, and alternating current induced in the secondary winding 43 of the transformer 39 energizes the alternator device 42 which supplies the primary winding 45 of the transformer 44 on the caboose with two hundred cycle alternating current, which induces an alternating current of like frequency in the secondary winding 50 of the transformer 44. The two hundred cycle alternating current thus excited in the secondary winding 50, is imposed on the train wires 12 and 13 through conductors 241 and 242 and conductors 234 and 235, respectively. The two hundred cycle alternating current excites the winding 105 of the tuned frequency relay 27 and causes the circuit through the winding 97 of the relay switch device 22 to be closed by closure of the bridging switch member 106, thus energizing the relay 22 and causing closure of the bridging switch members 98 and 102, which members remain closed as long as the winding 97 is energized. After the bridging switch members 98 and 102 have thus closed the circuit including the train wires 12 and 13 and the alternating current generator 19, the manual starting switch 23 may be opened. The starting switch 23 may be normally held in open position by a spring, not shown.

It is apparent from the foregoing, that interruption of a train wire 12 or 13, or their respective branch conductors, through which alternating current is supplied from the generator 19 on the locomotive to the primary winding 41 of the transformer 39 on the caboose, will cause deenergization of the alternator device 42 and consequent deenergization of the tuned relay switch 27, which will cause the switch member 106 to open the circuit through the winding 97 of the relay switch device 22. Deenergization of the relay switch device causes opening of the bridging switch members 98 and 102, which will remain open until the circuit is restored and the starting switch 23 again momentarily closed by the trainman.

Deenergization of the alternator 42 causes deenergization of the circuit through the magnet valve device 245 of the combined signal and brake application device 46 on the caboose and deenergization of the relay device 27 and consequent deenergization of the circuit through the magnet valve device 251 of the combined signal and brake application device 26 on the locomotive. Thus, in a manner to be more fully described, the warning signal devices 26 and 46 are substantially simultaneously sounded or operated on the locomotive and caboose, respectively, in the event of interruption of the conductors through which the electrical brake equipment is controlled.

The combined signal and brake application device 46 is similar to the signal device 26 shown in Fig. 4, and both devices operate to sound a signal when the electro-magnet winding thereof is deenergized, and to initiate, through a reduction in brake pipe pressure, an application of the brakes if the deenergization of the electro-magnet winding persists for a predetermined time, preferably two seconds.

When the electro-magnet winding of a signal device is energized, the magnet valve 84 is seated and valve 85 is unseated. Each signal device is charged from the brake pipe 11 through its respective branch pipe 20 or 38, fluid under pressure flowing from the branch pipe through a check valve 91, pipe and passage 92, valve chamber 89, past the open valve 85, chamber 94 and passage and pipe 96 to the reservoir 95.

Fluid under pressure also flows from the brake pipe 11 to the valve chamber 227 of the vent valve device 192 of the brake application portion of the signal device.

In the event that the winding of the combined signal and brake application device shown in Fig. 4, is deenergized, the valve 84 is unseated and the valve 85 is seated. Fluid then flows from the operating reservoir 95 to the fluid actuated signal whistle 87 through pipe and passage 96, chamber 94, past open valve 84, chamber 86 and passage and pipe 88, thus sounding a warning the instant the circuit through train wires 12 and 13 is interrupted. If the interruption of the circuit and consequent deenergization of the winding of the signal device persists for more than two seconds, sufficient fluid under pressure will flow through the restricted passage 224 into the timing reservoir and into the piston chamber 220, to build up sufficient fluid pressure on the upper face of the piston 219 to overcome the spring pressure and the brake pipe pressure acting on the valve 226 and cause it to be moved to open position, and thus vent fluid from the brake pipe through chamber 227, past the open valve 226, passage 229, chamber 246 and atmospheric passage 247. Fluid is thus vented from the brake pipe at a rate sufficient to so reduce the brake pipe pressure as to effect an application of the brakes on the train through operation of the triple valve devices 31.

It is apparent from the foregoing, that upon interruption of the circuit through the train wires 12 or 13, signals will be simultaneously sounded on the caboose and the locomotive by the operation of the signal devices 46 and 26, respectively, and that if the interruption of the circuit persists for more than two seconds, an application of the brakes will be initiated through a reduction of the brake pipe pressure initiated at each of said vent valve devices 192.

The time delay for initiating application of the brakes in the event of a circuit interruption is of particular advantage when it is desired to use the circuit through the train wires 12 and 13 for signalling purposes. It will be noted, that a signal switch 28, such as shown in Fig. 2, is connected in the conductor 58 on the locomotive and that a similar signal switch 48 is connected in the conductor 242 included in the circuit through the secondary winding 50 of the transformer 44 on the caboose.

As previously stated, the signal switches may be manually operated to open the circuit through their respective contacts and conductors, but when opened, are closed automatically before the expiration of two seconds. Therefore, it is not possible for the operator to hold the circuit through the train wires 12 and 13 open, through the medium of said switches, for a period of time exceeding two seconds.

When a trainman on the caboose desires to signal the trainman on the locomotive, the signal switch 48 is operated, which operation interrupts the circuit through the secondary winding 50 of the two hundred cycle transformer 44. This causes deenergization of the tuned relay switch device 27, which opens the bridging switch member 106 and interrupts the circuit through time delay relay switch device 22 and the winding 251 of the combined signal and brake application device 26. The signal 87 of device 26 is sounded, but since the circuit is reclosed by the signal switch 48 before two seconds has elapsed, the brake pipe vent valve device 192 of the device 26 does not function to effect an application of the brakes and the relay switch device 22 does not, therefore, function within the two-second interval to open the circuit through conductors 231 and 232. Since the sixty cycle alternating current supply to train wires 12 and 13 is not interrupted by the relay switch device 22, and since the signal switch device 48 on the caboose does not interrupt the connection between the secondary winding 50 of transformer 44 on the caboose to the rectifier 47 on the caboose, magnet valve device 245 of the combined signal and brake application device 46 on the caboose remains energized and thus the signal device 87 and vent valve device 192 on the caboose are not operated. The trainman may, therefore, repeat operation of the signal switch 48 to sound the signal device 87 on the locomotive, without danger of permanently opening the circuit through the train wires 12 and 13 and without danger of effecting an undesired application of the brakes.

Likewise, the engineman may operate the signal switch 28 on the locomotive to interrupt the sixty cycle current supplied to the train wires 12 and 13 and the primary winding 41 of the transformer 39 on the caboose, and to interrupt the two hundred cycle current flowing back through train wires 12 and 13 and winding 105 of the tuned frequency relay switch 27. Upon interruption of the sixty cycle current to the transformer 39, the alternator device 42 on the caboose stops generating current and thus the secondary winding 50 of the transformer 44 on the caboose no longer supplies current through rectifier 47 to the magnet valve device 245 of the combined signal and brake application device 46 on the caboose. The deenergization of relay switch 27 opens the circuit including the magnet valve device 251 of the combined signal and brake application device 26 on the locomotive. The signal switch device 28 recloses to cause flow of the sixty cycle and two hundred cycle current before the expiration of two seconds and thus the relay switch 22 does not open nor do the vent valve devices 192 of the combined signal and brake application devices 26 and 46 operate to effect an application of the brakes, the signal devices 87 on the locomotive and caboose being operated however. Thus, the signal switch 28 may be repeatedly operated to sound the signal devices 87 on both the locomotive and the caboose without causing an application of the brakes.

Provision is made in the improved system to effect an application of the brakes pneumatically by causing the vent valve devices 25 and 37 on the locomotive and caboose, respectively, to operate in the event of accidental reduction in brake pipe pressure such as may be occasioned by a broken brake pipe or a disconnected or broken hose coupling.

The vent valve devices 25 on the locomotive and 37 on the caboose, respectively, are of the type disclosed in Patent No. 1,972,747 granted to Raymond E. Miller, one of the applicants hereof, and Thomas W. Masterman, assigned to the assignee of this application.

The pneumatic switch device 24 and its associated brake pipe vent valve device 25 are charged from the brake pipe 11 through branch pipe 20, fluid under pressure flowing from pipe 20 to passage 74 and thence to the volume chamber 78, through chamber 73 above the piston 72, passage 261, chamber 75 beneath the piston 72, and passage 77. Fluid under pressure further flows to the vent valve chamber 262 through passage 74.

Upon a reduction in brake pipe pressure at an emergency rate, such as would be occasioned by a rupture of the brake pipe, the fluid pressure in the chamber 73 is reduced, and the higher pressure of the fluid acting on the under side of the piston 72, as supplied from the reservoir 78, causes the piston 72 to move upwardly and to move the slide valve 76 carried thereby to its upper position, wherein the passage 263 is uncovered by the slide valve 76 and communication is established from the reservoir 78 to the piston chamber 80 through passage 77, chamber 75, and passage 263. The higher fluid pressure acting on the right face of the piston 81 forces the vent valve 79 to open position, thus opening the vent valve chamber 262 to the atmospheric passage 264 through passage 265. The opening of the vent valve 79 connects passage 74 with the atmosphere, so that the fluid under pressure in chamber 62 of the pneumatic switch device is vented through pipe 69 and passage 74 to the atmosphere, thus reducing the fluid pressure in chamber 62 and permitting the spring 68 to move the piston 63 and bridging switch member 65 to open position. When the brake pipe pressure is restored to normal, the piston 72 is returned to the normal position shown in Fig. 3, due to the subsequent balance of pressures on opposite sides of the piston 72.

The brake pipe vent valve device 37 and pneumatic switch device 36 on the caboose are similarly charged from the brake pipe 11 through branch pipe 38 and operate in a manner similar to that of the devices 25 and 24 just described.

Should the brake pipe be ruptured at a point nearer to the locomotive than to the caboose, the brake pipe vent valve device 25 on the locomotive functions to vent the brake pipe to atmosphere at the locomotive and to so reduce the pressure on the piston 63 of the pneumatic switch device 24, that the spring 68 will force the piston to the right and thereby open the bridging switch member 65, thus causing interruption of the alternating current circuit through the train wires 12 and 13 and consequent deenergization of the primary winding 41 of the transformer 39 on the caboose. As a result, the two hundred cycle alternator 42 on the caboose ceases to function and rectifier 47 actuated thereby through transformer 44 ceases to supply current to winding 245 of the signal device 46 on the caboose. Upon deenergization of the winding 245, the whistle 87 on the caboose is sounded and the vent valve 226 on the caboose is opened in the manner hereinbefore described, so that fluid under pressure is vented from the brake pipe at an emergency rate at the rear end of the train, thereby effecting an application of the brakes on the rear cars of the train substantially two seconds after opening of the bridging switch 65 on the locomotive. In view of the cessation of the alternator 42, the two hundred cycle current supplied thereby through the train wires 12 and 13 to tuned frequency relay switch 27 on the locomotive is interrupted and magnet winding 105 deenergized to open contact bridging member 106. The winding of the magnet valve device 251 being thus deenergized, the signal and brake application device 26 on the locomotive functions to operate the whistle 87 thereof and effect venting of the brake pipe 11 at an emergency rate through the vent valve 226 thereof, whereby an emergency application of the brakes at the front end of the train is caused.

Should the brake pipe be ruptured nearer to the caboose than to the locomotive, the vent valve device 37 on the caboose functions to open the pneumatic switch device 36 and to interrupt the two hundred cycle alternating current circuit through the winding 245 of the signal device 46 on the caboose, thereby causing the sounding of the whistle 87 thereof and opening of the brake pipe vent valve 226 for effecting a reduction in brake pipe pressure at an emergency rate at the rear end of the train. Opening of the pneumatic switch device 36 also causes interruption of the two hundred cycle circuit through the train wires 12 and 13 and operation of the tuned frequency relay switch member 106 to open position, thus interrupting the circuit through the winding 251 of the combined signal and brake application device 26 on the locomotive, which causes sounding of the whistle 87 and opening of the brake pipe vent valve 226 of the signal device 26, which causes a reduction in brake pipe pressure at an emergency rate at the locomotive and effects an application of the brakes at the head end of the train substantially two seconds after the pneumatic switch 36 on the caboose is opened. Opening of the bridging switch member 106 of the tuned frequency relay switch device 27, causes deenergization of the winding 97 of the relay switch device 22, and since the deenergization of winding 97 continues longer than two seconds, also effects consequent opening of the bridging switch members 98 and 102. In order to restore the circuit to operating conditions, the manual starting switch 23 is again momentarily closed by the trainman.

From the foregoing, it is apparent that upon a reduction in brake pipe pressure, such as might be occasioned by a broken brake pipe or ruptured coupling hose, application of the brakes at the front and rear of the train will be effected substantially at the same time, so that the shock usually incident to the running in of the slack of the train under emergency application conditions will be materially reduced.

Telephones 29 and 49 are provided, respectively, on the locomotive and caboose and are connected across the conductors of the checking circuits as indicated in Figs. 1A and 1B, the telephone equipment comprising the usual battery 266 included in the circuit through a transmitter 267 and a primary winding 268 of a transformer 269 and a switch 271 that is automatically closed when the receiver 272 is lifted from its hook, not shown.

The telephone equipment is protected against alternating current and continuous current ripples by a suitable filter 273, and a condenser 274 is also inserted in the circuit to prevent interference of the direct current supplied to the train wires 12 and 13 by the generator 18, with the phone pulsations induced in the secondary winding 275 of the transformer 269. The trainmen may, therefore, converse by telephone when desired and the signal switches 28 and 48 may be operated to operate whistles 87 of the signal devices 26 and 46 when it is desired to call a trainman to the telephone.

It will be understood, that suitable filters and condensers are provided in the various circuits for blocking the flow of current of undesirable character and frequency to various parts of the equipment, some of which filters and condensers have heretofore been specifically mentioned. Filters 280, connected to the conductor 231, are designed to block the flow of two hundred cycle alternating current, and filter 281 is designed to block the flow of sixty cycle alternating current, thus isolating the generator 18 from alternating current impulses. It will be understood, that the said filters permit the flow of direct current from the generator 18 to the train wires 12 and 13.

Summarizing, the electro-pneumatic brake equipment includes a two wire conductor system that is energized with direct current and with alternating current, alternating preferably at frequencies of sixty and two hundred cycles. Other frequencies may, however, be employed. The magnet valve devices on the cars of the train serve to control the pneumatic brakes, which may also be controlled pneumatically in the usual manner.

With the brake valve and brake switch in release position, the magnet valve parts and the fluid pressure brake equipment on the cars assume their respective release positions. The two electro-magnet valve devices, which constitute parts of the electrical control equipment for controlling the operation of the pneumatic brake equipment, are so designed that when one of them is energized and the other deenergized, the brake equipment is caused to move to application or lap position, depending upon which magnet valve device is energized. The windings of the magnet valve device are so connected in the circuit through the two train wires and so associated with a polarized relay switch device, that when one train wire is connected to the positive pole of the generator through the medium of the brake switch, which is essentially a reversing switch having a neutral position, one of the magnets is energized and the other deenergized, and when the same train wire is connected to the opposite pole of the generator, the other magnet is energized and the one that was energized is then deenergized. The desired effect upon the brake equipment may be produced by manipulating the brake switch to either of its three operating positions.

Since the direct current circuit through the generator, train wires, and windings of the magnet valves is normally open by reason of the open brake switch, failure of the train wires would not ordinarily be apparent until an operation of the brakes through movement of the brake switch to either application or lap position is attempted.

In the improved system, interruption of a train wire is promptly indicated by reason of the provision of checking circuits energized with sixty cycle alternating current from a generator on the locomotive for controlling signalling and brake applying apparatus on the caboose, and with two hundred cycle alternating current generated by an alternator device on the caboose energized by the sixty cycle alternating current supplied from the locomotive, for controlling signalling and brake applying apparatus on the locomotive.

The checking circuits are energized by an alternating current generator on the locomotive and the alternating current circuit supplied by current from the generator is closed by a relay switch device having a holding winding energized through a switch controlled by a tuned frequency relay switch that is responsive to the two hundred cycle alternating current only, and which maintains the switch closed so long as the relay winding is energized with two hundred cycle current.

A manually operable normally open starting switch is provided for closing the circuit through the train wires, alternating current generator and a transformer on the caboose, until the holding winding of the relay switch is energized. After the relay switch is closed the starting switch may be released. The circuits are then energized through the closed relay switch.

Interruption of a train wire will promptly interrupt the circuit through the alternating current source of energy and cause opening of the relay switch, which is of the time delay type and opens only in the event that the circuit through the holding winding thereof is interrupted for more than two seconds. Opening of the relay switch deenergizes the checking circuits.

The checking circuits are provided on the locomotive and caboose with combined audible signal and brake application devices, so designed that immediately upon failure or interruption of a circuit through a train wire that would interfere with the proper operation of the electrical control apparatus of the brake system, a warning signal such as a whistle is sounded, and if the interruption persists for more than a predetermined time, such as two seconds, an application of the brakes is initiated at both ends of the train by opening a brake pipe vent valve device and reducing the brake pipe pressure at an emergency rate at the locomotive and the caboose.

The checking circuits are provided with manually operable signal switches that are capable of interrupting the circuit therethrough, but only for a period of time less than the predetermined time, such as two seconds at any one operation. Consequently, when desired, a trainman may cause sounding of the signal for signalling purposes without effecting an operation of the time delay switch or the time delay vent valve device.

Provision is also made for effecting initiation of an application of the brakes at both ends of the train in the event of failure of the brake pipe, which causes a reduction in brake pipe pressure at an emergency rate.

The brake pipe vent valve devices on the locomotive and on the caboose respond to a reduction in brake pipe pressure at an emergency rate and vent fluid under pressure from a pneumatic switch in each checking circuit, which is normally held closed by fluid at brake pipe pressure, so that the switch is operated to cause opening of the corresponding checking circuit.

Opening of the pneumatic switch on the caboose, due to a rupture of the brake pipe at a point nearer to the caboose than to the locomotive, effects interruption of the circuit including the winding of the combined signal and brake application device on the caboose as well as the interruption of the checking circuit through which two hundred cycle current is supplied to the tuned frequency relay switch on the locomotive. The deenergization of the relay switch on the locomotive effects deenergization of the winding of the combined signal and brake application device on the locomotive. The combined signal and brake application devices on both the caboose and locomotive are thus substantially simultaneously operated to give a signal and cause reduction in brake pipe pressure at an emergency rate at the rear and head ends of the train, respectively, so that the brakes are applied substantially simultaneously at both rear and head ends of the train, in addition to the brake application initiated at the point of rupture of the brake pipe.

If the point of rupture of the brake pipe is nearer to the locomotive than to the caboose the brake pipe vent valve device on the locomotive operates to effect a reduction in fluid pressure on the pneumatic switch on the locomotive, so that the switch is opened to interrupt the sixty cycle alternating current circuit for operating the alternator on the caboose. The alternator on the caboose, therefore, ceases to generate current and thus the magnet winding of the combined signal and brake application device on the caboose is deenergized to effect sounding of a signal and initiate an application of the brakes at the rear end of the train. Cessation of the supply of current from the alternator on the caboose causes deenergization of the tuned relay switch on the locomotive which thus effects deenergization of the magnet winding of the combined signal and brake application device on the locomotive at substantially the same time that the deenergization of the magnet winding of the combined signal and brake application device occurs. Consequently a signal is sounded and an application of the brakes initiated substantially simultaneously at the head and rear ends of the train, in addition to the application initiated at the point of rupture in the brake pipe.

From the foregoing, it is apparent that upon accidental interruption of the electrical control circuit or upon rupture of the brake pipe, a warning signal is sounded on the locomotive and caboose and an application of the brakes is promptly initiated at both ends of the train. Signalling may also be accomplished without effecting an application of the brakes.

The checking circuit is provided with a telephone system whereby remotely disposed trainmen may converse.

It is obvious that while we have disclosed but one embodiment of our invention, that omissions, additions and other changes may be made in the equipment disclosed without departing from the spirit of the invention.

Having now described our invention, what we claim as new and desire to secure by Letters Patent, is:

1. In an electrically controlled train brake system, the combination with a pair of train conductors, a source of direct current, a source of alternating current at one end of the train and electrically controlled devices responsive to direct current and disposed on the cars and caboose and adapted upon energization to effect an operation of the brakes, of a switch for connecting said direct current source to said conductors for completing a circuit through said electrically controlled devices for effecting an operation of the brakes, a current operated switch for connecting said alternating current source to said conductors for establishing an alternating current circuit therethrough when said current operated switch is energized, a second current operated switch for controlling the circuit through said first current operated switch and for completing said circuit when energized, a current modifier on the other end of the train operating on alternating current supplied from said alternating current source through said conductors and connected to said conductors for establishing a circuit through said second current operated switch and for energizing said switch, and separate current responsive indicating means connected respectively in the energizing circuit through said conductors and said current modifier and in the circuit energized by said current modifier through said conductors and said second current operated switch adapted to indicate the condition of their respective circuits.

2. In an electrically controlled train brake system, the combination with a pair of train conductors, a source of direct current, a source of alternating current on one end of the train and electrically controlled devices responsive to direct current and disposed on the cars and caboose and adapted upon energization to effect an operation of the brakes, of a switch for connecting said direct current source to said conductors for completing a circuit through said electrically controlled devices for effecting an operation of the brakes, a current operated switch for connecting said alternating current source to said conductors for establishing an alternating current circuit therethrough when said current operated switch is energized, a second current operated switch for controlling the circuit through said first current operated switch and for completing said circuit when energized, a current modifier on the other end of the train operating on alternating current supplied from said alternating current source through said conductors and connected to said conductors for establishing a circuit through said second current operated switch and for energizing said switch, separate current responsive indicating means connected respectively in the energizing circuit through said conductors and said current modifier and in the circuit energized by said current modifier through said conductors and said second current operated switch adapted to indicate the condition of their respective circuits, and a manually operable starting switch for momentarily connecting said source of alternating current to said conductors for momentarily energizing the alternating current circuit through said conductors and said current generator.

3. In a brake system, the combination with a pair of train conductors, a source of direct current, a source of alternating current on one end of the train and electrically controlled devices responsive to direct current and disposed on the cars and caboose and adapted upon energization to effect an operation of the brakes, of a switch for connecting said direct current source to said conductors for completing a circuit through said electrically controlled devices for effecting an operation of the brakes, a current operated switch for connecting said alternating current source to said conductors for establishing an alternating current circuit therethrough when said current operated switch is energized, a second current operated switch for controlling the circuit through said first current operated switch and for completing said circuit when energized, a current modifier on the other end of the train operating on alternating current supplied from said alternating current source through said conductors and connected to said conductors for establishing a circuit through said second current operated switch and for energizing said switch, and separate current responsive means connected respectively in the energizing circuit through said conductors and said current modifier and in the circuit energized by said current modifier through said conductors and said second current operated switch and adapted to effect an application of the brakes when deenergized.

4. In a train brake system, the combination with a brake pipe, a pair of train conductors, a source of direct current, a source of alternating current on one end of the train and electrically controlled devices responsive to direct current and disposed on the cars and caboose and adapted upon energization to effect an operation of the brakes, of a switch for connecting said direct current source to said conductors for completing a circuit through said electrically controlled devices for effecting an operation of the brakes, a current operated switch for connecting said alternating current source to said conductors for establishing an alternating current circuit therethrough when said current operated switch is energized, a second current operated switch for controlling the circuit through said first current operated switch and for completing said circuit when energized, a current modifier on the other end of the train operating on alternating current supplied from said alternating current source through said conductors and connected to said conductors for establishing a circuit through said second current operated switch and for energizing said switch, and separate switch means responsive to variations in brake pipe pressure and operative upon predetermined pressure conditions in the brake pipe for respectively opening the circuits through said energizing circuit including said conductors and said modifier, and for opening the circuit energized by said current modifier and including said conductors and said second current operated switch.

5. In an electrically controlled train brake system, the combination with an electrical circuit extending throughout the train, a source of direct current, a switch means for connecting said source to said circuit, a second source of current alternating at a predetermined frequency, a second switch means for connecting said second source to said circuit, a third source of current alternating at another predetermined frequency normally connected to said circuit, and electrically controlled devices on the cars of the train responsive to current and connected to said circuit, of means for preventing alternating current supplied by said second and third sources from effecting operation of said devices, means responsive to current supplied to the circuit by said third source for effecting closure of said second switch means when energized, and current responsive signal devices adapted to indicate the condition of the supply circuit in which they are respectively connected, one of which is so connected in said circuit that it is energized by current supplied to said circuit by said second source, and the other of which is so connected in said circuit that it is energized by current supplied to the circuit by said third source.

6. In an electrically controlled train brake system, the combination with an electrical circuit extending throughout the train, a source of direct current, a switch means for connecting said source to said circuit, a second source of current alternating at a predetermined frequency, a second switch means for connecting said second source to said circuit, a third source of current alternating at another predetermined frequency normally connected to said circuit, and electrically controlled devices on the cars of the train responsive to current and connected to said circuit, of means for preventing alternating current supplied by said second and third sources from effecting operation of said devices, a tuned frequency relay switch means responsive to current supplied to the circuit by said third source for effecting closure of said second switch means when energized, and current responsive signal devices adapted to indicate the condition of the supply circuit in which they are respectively connected, one of which is so connected in said circuit that it is energized by current supplied to said circuit by said second source, and the other of which is so connected to said circuit that it is energized by current supplied to the circuit by said third source.

7. In an electrically controlled train brake system, the combination with an electrical circuit extending throughout the train, a source of direct current, a switch means for connecting said source to said circuit, a second source of current alternating at a predetermined frequency, a second switch means for connecting said second source to said circuit, a third source of current energized by current supplied to said circuit by said second source and alternating at another predetermined frequency normally connected to said circuit, and electrically controlled devices on the cars of the train responsive to current and connected to said circuit, of means for preventing alternating current supplied by said second and third sources from effecting operation of said devices, means responsive to current supplied to the circuit by said third source for effecting closure of said second switch means when energized, and current responsive signal devices adapted to indicate the condition of the supply circuit in which they are respectively connected, one of which is so connected in said circuit that it is energized by current supplied to said circuit by said second source, and the other of which is so connected in said circuit that it is energized by current supplied to the circuit by said third source.

8. The combination with an electrically operated brake controlling device connected in a circuit including a source of direct current, of a source of alternating current, a third source of current energized by current supplied through said circuit from said alternating current source, and current responsive signal devices connected in said circuit, one of which is energized by current supplied from said source of alternating current, and the other of which is energized by current supplied by said third current source, each of said signal devices being effective upon deenergization thereof to give a signal.

9. The combination with a brake controlling device connected in a circuit including a source of direct current, of a source of alternating current, a third source of current energized by current supplied through said circuit from said alternating current source, and current responsive means connected in said circuit, one of which is energized by current supplied from said source of alternating current, and the other of which is energized by current supplied by said third current source, each of said current responsive means being effective upon deenergization thereof to independently initiate an application of the brakes.

10. The combination with electrically operated brake controlling devices connected in a circuit including a source of direct current, of a second source of alternating current, a third source of current energized by current supplied through said circuit from said alternating current source for supplying current to said circuit and having characteristics different from the current supplied by the other sources, a switch device for controlling the circuit through said second source operating on current supplied by the third source and adapted to effect opening of the circuit through the second source when deenergized, and current responsive signal devices connected in said circuit, one of which is energized by current supplied from said source of alternating current, and the other of which is energized by current supplied by said third current source, each of said signal devices being effective upon deenergization thereof to give a signal.

11. The combination with electrically operated brake controlling devices connected in a circuit including a source of direct current, of a second source of alternating current, a third source of current energized by current supplied through said circuit from said alternating current source for supplying current to said circuit having characteristics different from the current supplied by the other sources, a switch device for controlling the circuit through said second source operating on current supplied by the third source and adapted to effect opening of the circuit through the second source when deenergized, and current responsive means connected in said circuit, one of which is energized by current supplied from said second source of current, and the other of which is energized by current supplied by said third current source, each of said current responsive means being effective upon deenergization to independently initiate an application of the brakes.

12. In a train brake system, a normally closed circuit having a source of alternating current connected therein, a source of direct current adapted to be connected in said circuit to supply direct current into said circuit, a brake controlling device, a polarized relay device operating on direct current in said circuit and movable to one or another position dependent upon the polarity of the direct current source in said circuit to effect operation of said brake controlling device, a switch device for reversing the polarity of the direct current source in said circuit, means preventing the alternating current in said circuit from affecting said polarized relay, and means for normally maintaining said alternating current source connected in said circuit and for causing said alternating current source to be disconnected from said circuit upon cessation of flow of alternating current in said circuit.

13. In a brake system, the combination of a magnet for effecting one operation of the brakes, a second magnet for effecting another operation of the brakes, a train wire for supplying current to both magnets, current responsive means operated by flow of direct current through the train wire in one direction for connecting one magnet to said train wire and by flow in the reverse direction for connecting the other magnet to said train wire, a current responsive signal device connected to said train wire adapted to signal when deenergized, a source of alternating current connected to the train wire for effecting energization of said signal device, and means for preventing the alternating current from effecting operation of said current responsive means.

14. In an electro-pneumatic brake, the combination of a magnet for effecting one operation of the brakes, a second magnet for effecting another operation of the brakes, a train wire for supplying current to both magnets, current responsive means operated by flow of direct current through the train wire in one direction for connecting one magnet to the train wire and by flow in the reverse direction for connecting the other magnet to said train wire, a normally energized current responsive device connected to said wire for pneumatically effecting an application of the brakes when deenergized, a source of alternating current connected to said train wire for effecting energization of said current responsive device, and means for rendering said alternating current ineffective for operating said current responsive means.

15. In an electro-pneumatic brake, the combination of a magnet for effecting one operation of the brakes, a second magnet for effecting another operation of the brakes, a train wire for supplying current to both magnets, current responsive means operated by flow of direct current through said train wire in one direction for connecting one magnet to the train wire and by flow in the reverse direction for connecting the other magnet to said train wire, a normally energized current responsive device connected to said wire for pneumatically effecting an application of the brakes when deenergized, a source of alternating current connected to said train wire for effecting energization of said current responsive device, means for rendering said alternating current ineffective for operating said current responsive means, a telephone circuit connected to said train wire, and means for rendering said alternating current ineffective to impose interfering current alternations in said telephone circuit.

16. In a brake, the combination with current responsive means operated by direct current for operating the brakes, a source of direct current, a train wire for supplying current to said means, of a normally energized signal device connected to said train wire adapted to signal when deenergized, a source of alternating current connected to said train wire for effecting energization of said signal device, means for rendering said alternating current ineffective to operate said current responsive means, a telephone circuit connected to said train wire, and means for rendering said alternating current ineffective to impose interfering current alternations on said telephone circuit.

17. In a brake, the combination with current responsive means operated by direct current for operating the brakes, a source of direct current, a train wire for supplying current to said means, of a normally energized device connected to said train wire for translating energy when deenergized, a source of alternating current connected to said train wire for effecting energization of said device, means for rendering said alternating current ineffective to operate said current responsive means, a telephone circuit connected to said train wire, and means for rendering said alternating current ineffective to impose interfering current alternations on said telephone circuit.

18. The combination with a brake controlling device connected in a circuit comprising a pair of conductors, a source of direct current connected across the said conductors for energizing said brake controlling device, a source of alternating current connected across said conductors, a third source of current connected across said conductors and energized by current supplied from said alternating current source, of current responsive energy translating devices connected across said conductors, one of which is energized by current supplied from said source of alternating current, and the other of which is energized by current supplied by said third source of current.

19. The combination in a brake system having an electrical circuit comprising a pair of current conductors and three sources of electrical current connected across the said conductors for severally and simultaneously supplying to said conductors, current having three distinctly different characteristics, of a current responsive brake controlling device connected across said conductors and responsive only to current having one said characteristic and supplied from one of said sources, and two current responsive energy translating devices, one of which is responsive only to current supplied from one of the remaining sources of current, and the other being responsive only to current supplied from the other of the said remaining sources of current.

20. The combination in a brake system having an electrical circuit comprising a pair of current conductors and three sources of electrical current connected across said conductors for severally supplying to said conductors current having three distinctly different characteristics, of a current responsive brake controlling device connected across said conductors and responsive only to current having one said characteristic and supplied from one of said sources, and two current responsive energy translating devices connected across said conductors, one of which is responsive only to current supplied from one of the remaining sources of current, and the other being responsive only to current supplied from the other of the said remaining sources of current, said energy translating devices being normally energized by current supplied fom their respective sources and adapted to operate when the circuit through said conductors and said energy translating devices is interrupted.

21. The combination in a brake system having an electrical circuit comprising a pair of current conductors and three sources of electrical current connectible across said conductors for severally supplying to said conductors current having three distinctly different characteristics, one of said sources being normally disconnected from said conductors and the other sources being normally connected across said conductors and one of said sources shunting a portion of the conductors including the first said source, of a current responsive brake controlling device connected across an unshunted portion of said conductors and energized only by current supplied from the source of current normally disconnected from said conductors and adapted to effect application of the brakes only when energized by current supplied from its respective source, and two current responsive energy translating devices connected across said unshunted portion of said conductors, one of which is responsive only to current supplied from one of the remaining sources of current, and the other being responsive only to current supplied fom the other of said remaining sources of current, said energy translating devices being normally energized by current supplied from their respective sources and adapted to operate when the circuit through said unshunted portion of said conductors is interrupted.

22. In an electro-pneumatic brake, the combination with a reservoir, a brake cylinder, and a brake controlling valve device normally establishing communication through which fluid under pressure is released to atmosphere from the brake cylinder, of a single current responsive device operative upon energization to close off the exhaust of fluid under pressure from the brake cylinder through said communication and to effect the supply of fluid under pressure from the reservoir to the brake cylinder, and operative upon deenergization to effect closing off of the supply of fluid under pressure to the brake cylinder from said reservoir and to connect said communication to atmosphere.

23. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, and a second current responsive valve device adapted when energized to close said exhaust passage and when deenergized to open said exhaust passage.

24. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device adapted when energized to close said exhaust passage and when deenergized to open said exhaust passage, and means for alternately effecting energization of said current responsive valve devices.

25. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device adapted when energized to close said exhaust passage and when deenergized to open said exhaust passage, and means for alternately effecting energization of said current responsive valve devices and concurrent deenergization thereof.

26. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device adapted when energized to close said exhaust passage and when deenergized to open said exhaust passage, and current responsive means for selectively alternately effecting energization of said current responsive valve devices.

27. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device adapted when energized to close said exhaust passage and when deenergized to open said exhaust passage, and current responsive means for selectively alternately effecting energization of said current responsive valve devices when energized and for effecting concurrent deenergization of said current responsive valve devices when deenergized.

28. In an electro-pneumatic brake, the combination with a reservoir, a brake cylinder adapted to be supplied with fluid under pressure from said reservoir and having a normally open exhaust passage, and a fluid pressure actuated valve device for controlling the delivery of fluid under pressure to said brake cylinder from said reservoir and normally held closed by fluid under pressure, of a current responsive valve device for controlling the said fluid under pressure acting on said fluid pressure actuated valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device adapted when energized to close said exhaust passage and when deenergized to open said exhaust passage, and a polarized relay means for selectively alternately effecting energization of said current responsive valve devices.

29. In an electro-pneumatic brake, the combination with a reservoir, a brake cylinder adapted to be supplied with fluid under pressure from said reservoir and having a normally open exhaust passage, a fluid pressure actuated valve device for controlling the delivery of fluid under pressure to said brake cylinder from said reservoir and normally held closed by fluid under pressure, a second fluid pressure actuated valve device adapted when in open position to increase the flow capacity of said exhaust passage and normally held in closed position by fluid under pressure, of a current responsive valve device for controlling the said fluid under pressure acting on the first said valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, and a second current responsive valve device for controlling the fluid under pressure acting on said second valve device for closing said exhaust passage when energized and to effect opening of said second valve device to increase the flow capacity of said exhaust passage when deenergized.

30. In an electro-pneumatic brake, the combination with a reservoir, a brake cylinder adapted to be supplied with fluid under pressure from said reservoir and having a normally open exhaust passage, a fluid pressure actuated valve device for controlling the delivery of fluid under pressure to said brake cylinder from said reservoir and normally held closed by fluid under pressure, a second fluid pressure actuated valve device adapted when in open position to increase the flow capacity of said exhaust passage and normally held in closed position by fluid under pressure, of a current responsive valve device for controlling the said fluid under pressure acting on the first said valve device for closing said exhaust passage and for effecting delivery of fluid under pressure to said brake cylinder when energized and for effecting opening of said exhaust passage and for preventing delivery of fluid under pressure to said brake cylinder from said reservoir when deenergized, a second current responsive valve device for controlling the fluid under pressure acting on said second valve device for closing said exhaust passage when energized and to effect opening of said second valve device to increase the flow capacity of said exhaust passage when deenergized, and means for effecting closure of both of said valve devices a predetermined time after their respective current responsive valve devices are deenergized.

31. In an electro-pneumatic brake, the combination with a reservoir, a brake cylinder adapted to be supplied with fluid under pressure from said reservoir and having an exhaust passage, of a fluid pressure actuated valve device for controlling the delivery of fluid under pressure to said brake cylinder from said reservoir and normally held closed by fluid under pressure, a second fluid pressure actuated valve device normally held in closed position by fluid under pressure for controlling the flow of fluid from said brake cylinder through said exhaust passage and when in open position to permit fluid under pressure to flow through said exhaust passage, and separate current responsive valve devices for respectively controlling the fluid acting on said valve devices, one of which is adapted upon energization to effect opening movement of the first said valve device and the other of which is adapted upon deenergization to effect opening movement of the second of said valve devices.

32. In an electro-pneumatic brake, the combination with a reservoir, a brake cylinder adapted to be supplied with fluid under pressure from said reservoir and having an exhaust passage, of a fluid pressure actuated valve device for controlling the delivery of fluid under pressure to said brake cylinder from said reservoir and normally held closed by fluid under pressure, a second fluid pressure actuated valve device normally held in closed position by fluid under pressure for controlling the flow of fluid from said brake cylinder through said exhaust passage and when in open position to permit fluid under pressure to flow through said exhaust passage, separate current responsive valve devices for respectively controlling the fluid acting on said valve devices, one of which is adapted upon energization to effect opening movement of the first said valve device and the other of which is adapted upon deenergization to effect opening movement of the second said valve device, and means for alternately energizing said current responsive valve devices.

33. In an electro-pneumatic brake, the combination with a reservoir, a brake cylinder adapted to be supplied with fluid from said reservoir and having an exhaust passage, of a fluid pressure actuated valve device for controlling the delivery of fluid under pressure to said brake cylinder from said reservoir and normally held closed by fluid under pressure, a second fluid pressure actuated valve device normally held in closed position by fluid under pressure for controlling the flow of fluid from said brake cylinder through said exhaust passage and when in open position to permit fluid to flow through said exhaust passage, separate current responsive valve devices for respectively controlling the fluid acting on said valve devices, one of which is adapted upon energization to effect opening movement of the first said valve device and the other of which is adapted upon deenergization to effect opening movement of the second said valve device, and means for alternately energizing said current responsive valve devices and for concurrently deenergizing the last said devices.

34. In an electro-pneumatic brake equipment, the combination with a brake cylinder, of an electrically controlled valve device operative to one position to effect the supply of fluid under pressure to the brake cylinder and to another position to establish a communication through which fluid is released from the brake cylinder and an electrically controlled valve device for controlling the communication through which fluid is released from the brake cylinder by operation of said first mentioned valve device.

35. In an electro-pneumatic brake equipment, the combination with a brake cylinder, of an electrically controlled application valve device operative to effect the supply of fluid under pressure to the brake cylinder, a relay valve device subject on one side to the pressure of fluid supplied to the brake cylinder and having a restricted port through which fluid equalizes to the opposite side of said relay valve device, and operative by venting fluid from one side for establishing a communication through which fluid is released from the brake cylinder, and an electrically controlled valve device operative to vent fluid from one side of said relay valve device.

36. In an electro-pneumatic brake equipment, the combination with a brake cylinder, of an electrically controlled application valve device operative to effect the supply of fluid under pressure to the brake cylinder and to establish a communication through which fluid is released from the brake cylinder, a relay valve device subject to the pressure of fluid supplied to the brake cylinder and operated upon venting fluid therefrom to establish a communication through which fluid is released from the brake cylinder, and an electrically controlled valve device operative to control communication through which fluid is released from the brake cylinder by operation of said application valve device, and also operative to vent fluid from said relay valve device.

37. The combination in a brake system having an electrical circuit system and three sources of electrical current connected in said system for severally supplying to said system, current having three distinctly different characteristics, of a current responsive brake controlling device connected in said system and responsive only to current having one said characteristic and supplied from one of said sources, and two current responsive energy translating devices, one of which is responsive only to current supplied from one of the remaining sources of current, and the other being responsive only to current supplied from the other of said remaining sources of current.

38. In a train braking system, the combination with a circuit system extending through a train, of a source of electric current included in said circuit system for supplying current of a certain characteristic to said system, electro-responsive means included in said circuit system and located at a point in the train remote from said source of current and energized by current from said source to supply current of a different characteristic to said circuit system, a normally energized electro-responsive element operative upon deenergization to effect an emergency application of the brakes, and a device included in said circuit system and responsive only to current supplied by said electro-responsive means for maintaining the circuit closed through said element.

39. In a train braking system, the combination with a circuit system extending through a train, of a source of electric current included in said circuit system for supplying current of a certain characteristic to said system, electro-responsive means included in said circuit system and located at a point in the train remote from said source of current and energized by current from said source to supply current of a different characteristic to said circuit system, a normally energized electro-responsive element operative upon de-energization to effect an emergency application of the brakes, and electrically controlled means included in said circuit system responsive only to the current supplied by said electro-responsive means for effecting energization of said element.

40. In a train braking system, the combination with a circuit system extending through a train, of a source of electric current included in said circuit system for supplying current of a certain characteristic to said system, electro-responsive means included in said circuit system and located at a point in the train remote from said source of current and energized by current from said source to supply current of a different characteristic to said circuit system, a normally energized electro-responsive element operative upon deenergization to effect an emergency application of the brakes, and electrically controlled means included in said circuit system responsive only to the current supplied by said electro-responsive means for effecting energization of said element and operative upon the interruption of the flow of current therethrough to effect the deenergization of said element.

41. In a train braking system, the combination with two train wires extending through a train, of a source of electric current of a certain characteristic connected across said train wires, electro-responsive means connected across said train wires at a point in the train remote from said source of current and energized by current from said source to supply current of a different characteristic to said train wires, a normally energized electro-responsive element operative upon deenergization to effect an emergency application of the brakes, and a device connected across said train wires and responsive only to the current supplied by said electro-responsive means for maintaining closed the circuit through said element.

42. In an electro-pneumatic brake, the combination with a reservoir, a brake cylinder, and a brake controlling valve device normally establishing communication through which fluid under pressure is released to atmosphere from the brake cylinder, of a current responsive device operative upon energization to close off the exhaust of fluid under pressure from the brake cylinder through said communication and to effect the supply of fluid under pressure from the reservoir to the brake cylinder, and operative upon deenergization to effect closing off of the supply of fluid under pressure to the brake cylinder from said reservoir and to connect said communication to atmosphere, and a second current responsive device operative upon energization to close said communication and upon deenergization to open said communication.

43. In an electric brake system, in combination, a normally closed circuit including a source of alternating current of a certain frequency, electro-responsive devices operating only on direct current flowing in said circuit for controlling the brakes, a second source operating on alternating current of said certain frequency flowing in said circuit for supplying alternating current of a different frequency to said circuit, and a pair of electro-responsive signal devices normally energized by current supplied from said first and second sources respectively, each of said signal devices being adapted upon deenergization to give a signal.

44. In an electric brake system, in combination, a normally closed circuit including a source of alternating current of a certain frequency, electro-responsive devices operating only on direct current flowing in said circuit for controlling the brakes, a second source operating on alternating current of said certain frequency flowing in said circuit for supplying alternating current of a different frequency to said circuit, a pair of electro-responsive signal devices normally energized by current supplied from said first and second sources respectively, each of said signal devices being adapted upon deenergization to give a signal, and current responsive means normally energized by current of the said different frequency flowing in said circuit and effective upon deenergization to effect deenergization of the signal device operating on current from the first source.

45. In an electric brake system, in combination, a normally closed circuit including a source of alternating current of a certain frequency, electro-responsive devices operating only on direct current flowing in said circuit for controlling the brakes, a second source operating on alternating current of said certain frequency flowing in said circuit for supplying alternating current of a different frequency to said circuit, a pair of electro-responsive signal devices normally energized by current supplied from said first and second sources respectively, each of said signal devices being adapted upon deenergization to give a signal, current responsive means normally energized by current of the said different frequency flowing in said circuit and effective upon deenergization to effect deenergization of the signal device operating on current from the first source, and means controlled by said current responsive means and adapted upon deenergization of said current responsive means to interrupt said normally closed circuit.

46. In an electric brake system, in combination, a normally open circuit, a source for supplying current of a certain characteristic through said circuit when closed, electro-responsive means operating on said circuit and responsive only to current of said certain characteristic for controlling the brakes, a normally closed circuit including a portion of said normally open circuit, a source for supplying current of a characteristic different from said certain characteristic through said normally closed circuit, a second normally closed circuit including a portion of said normally open circuit, a source for supplying current of a characteristic different from that supplied by either of the aforesaid sources through said second normally closed circuit and adapted to be operatively energized by current flowing through said first normally closed circuit, electro-responsive means operating on said second normally closed circuit and adapted to effect an application of the brakes upon cessation of flow of current in said second normally closed circuit, and electro-responsive means operating on said first normally closed circuit and adapted to effect an application of the brakes upon cessation of flow of current in said first normally closed circuit.

47. In an electro-pneumatic brake system, in combination, a brake pipe, a normally closed circuit including a source of alternating current of a certain frequency, electro-responsive devices operating only on direct current flowing in said circuit for controlling the brakes, a second source operating on alternating current of the said certain frequency flowing in said circuit for supplying alternating current of a different frequency to said circuit, a pair of electro-responsive signal devices normally energized by current supplied from said first and said second sources, respectively, each of said signal devices being adapted upon deenergization to give a signal, and switch means controlled by variations in brake pipe pressure and adapted upon a reduction in brake pipe pressure to effect deenergization of said signal devices.

48. In an electro-pneumatic brake system, in combination, a brake pipe, a normally closed circuit including a source of alternating current of a certain frequency, electro-responsive devices operating only on direct current flowing in said circuit for controlling the brakes, a second source operating on alternating current of the said certain frequency flowing in said circuit for supplying alternating current of a different frequency to said circuit, a pair of electro-responsive signal devices normally energized by current supplied from said first and said second sources, respectively, each of said signal devices being adapted upon deenergization to give a signal, current responsive means normally energized by current of said different frequency flowing in said circuit and effective upon deenergization to effect deenergization of the signal device operating on current from said first source, and switch means controlled by variations in brake pipe pressure and adapted upon a reduction in brake pipe pressure to interrupt the supply of current of said different frequency from said second source to the signal device energized thereby and to said current responsive means.

49. In an electric brake system, in combination, a pair of electro-responsive devices adapted to control the operation of the brakes, a polarized relay device adapted to effect energization of one or the other of said devices depending upon whether it is actuated to one position or another position, and means for controlling the movement of said relay device to one or the other position.

50. In an electric brake system, in combination, an electro-responsive device adapted upon energization to effect an application of the brakes, a second electro-responsive device adapted upon energization to maintain the brakes applied, a normally open circuit, a source of current adapted to be included in said normally open circuit, when closed, for supplying current to said electro-responsive devices, and current responsive means operating on said circuit and effective to connect only one of said electro-responsive devices in said circuit when the said source of current has a certain polarity in the said circuit and to connect only the other of said electro-responsive devices in said circuit when the polarity of said source of current in the circuit is reversed.

RAYMOND E. MILLER.
PHILIP L. CRITTENDEN.